No. 675,393. Patented June 4, 1901.
R. M. KEATING.
MOTOR BICYCLE.
(Application filed Mar. 28, 1901.)
(No Model.)
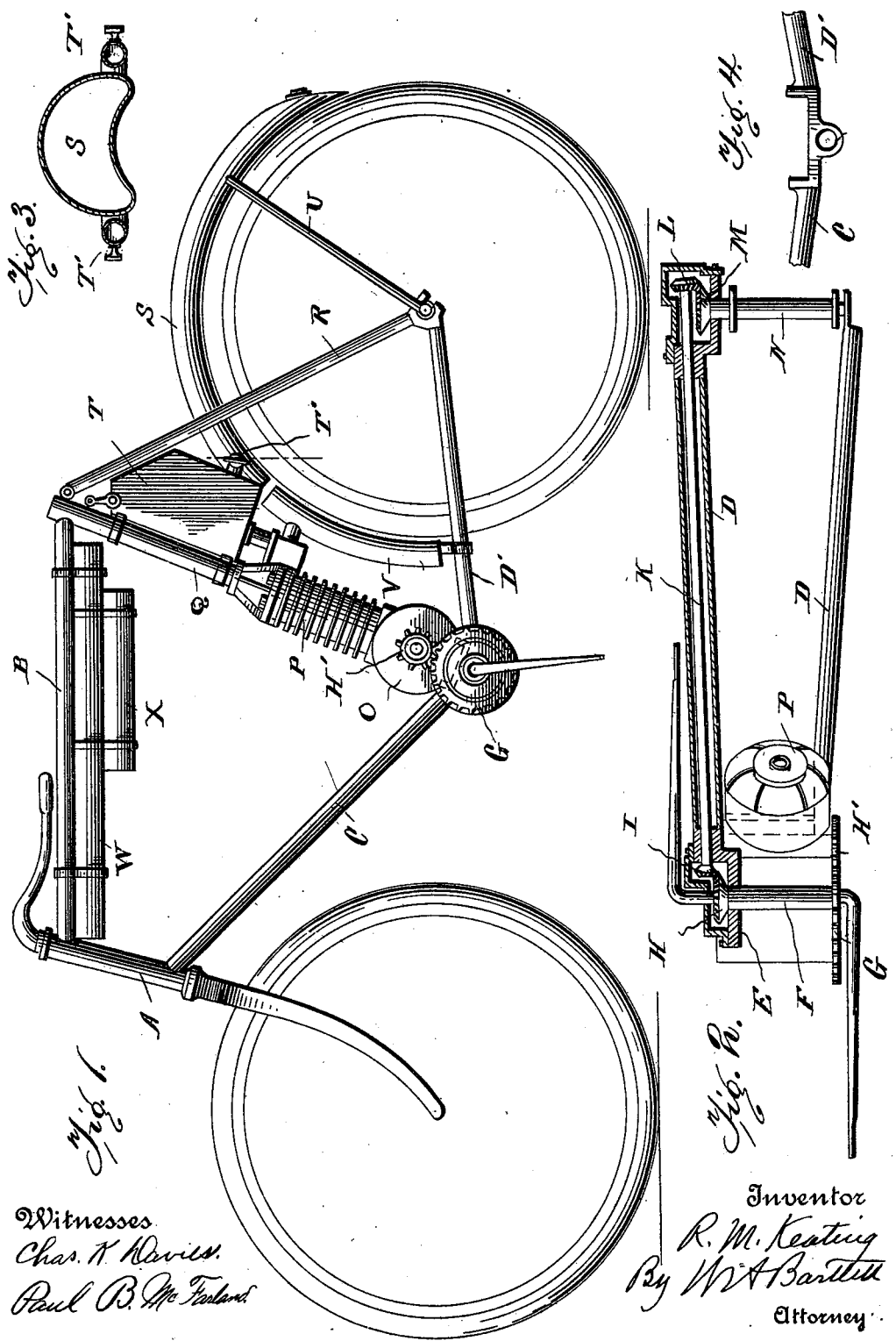

UNITED STATES PATENT OFFICE.

ROBERT M. KEATING, OF MIDDLETOWN, CONNECTICUT, ASSIGNOR TO R. M. KEATING MOTOR COMPANY, OF PORTLAND, MAINE.

MOTOR-BICYCLE.

SPECIFICATION forming part of Letters Patent No. 675,393, dated June 4, 1901.

Application filed March 28, 1901. Serial No. 53,198. (No model.)

*To all whom it may concern:*

Be it known that I, ROBERT M. KEATING, residing at Middletown, in the county of Middlesex and State of Connecticut, have invented certain new and useful Improvements in Motor-Bicycles, of which the following is a specification, reference being had therein to the accompanying drawings.

This invention relates to motor-bicycles.

The object of the invention is to produce a motor-bicycle of very compact construction and wherein the frame shall not only serve as a support for the engine and its appendages, but be itself supported and strengthened by the engine and its usual close appendages.

Figure 1 is a side elevation of the bicycle, unnecessary parts being omitted. Fig. 2 is a section on the line of the lower frame-bars, one of which bars is shown in section. Fig. 3 is a cross-section of mud-guard and supplementary reservoir. Fig. 4 is a detail side elevation of frame-strut.

The frame is of usual diamond shape, having front post A, front upper bar B, and front lower bar C, which may be of any well-known form.

The front lower bar C and the lower rear bars D D' are connected to the crank-hanger E by a strut, which crank-hanger strut is also a platform for the engine-base.

The pedal-shaft sleeve F bears a gear-wheel G, with which the small driving-gear H' of the engine engages. The pedal-shaft in sleeve F may be coupled to the sleeve by forward pedaling, as is common, so that the pedals may be used to start or reinforce the engine, but need not be driven forward by the engine. Sleeve F has a bevel-gear H, which engages the bevel-gear I on shaft K. Shaft K is inside frame-bar D, and by means of bevel-gears L M conveys motion to the hub N of the driving-wheel. The pedal-shaft and the engine are thus connected to the driving-wheel by a very compact arrangement of driving-gearing.

The engine O rests on its seat or strut above the pedal-shaft. The motor-cylinder P projects upward, and the seat-post Q forms a continuation thereof. The engine and cylinder thus form a component part of the seat-post between the lower and upper frame-bars.

The rear frame-bars are connected to the seat-post and to the rear hub-bearings in usual manner.

The mud-guard S is hollow and is a storage-reservoir for gasolene and is connected with the main tank T by any convenient passage controlled by a valve, cock, or stopper T'. The gasolene in tank S can be drawn into the tank T by lifting the rear wheel when the arrangement is such that the liquid will not otherwise run into tank T from tank S. The mud-guard S is supported by the usual bars U and by connection to the tank T and may be braced from bars R when desirable. The gasolene-tank T is secured to the seat-post between the same and the upper rear bars and is connected to the engine in usual manner.

The exhaust from the engine is into the muffler V, which is curved, as a continuation of the mud-guard. The muffler is supported from the lower rear frame-bars D D' and from the engine. The exhaust is preferably downward just in front of the rim of the drive-wheel.

The spark-coil is carried in short cylinders W X, arranged just below and supported from the upper frame-bar B.

It will be seen that this arrangement of frame and attachments is very compact. Many of the parts have the usual function of corresponding parts in ordinary bicycles, with additional functions adapting them to their work in a motor-bicycle as well. Hence the frame structure and attachments become very compact and light, the desirability of which in a motor-bicycle is apparent.

In another application filed by me July 6, 1900, Serial No. 22,662, I show the engine with its cylinder extending upward and forming a part of the seat-post. In that case the engine-casing forms the pedal-bracket, part of the engine extending below the frame proper. In the present case the engine rests on a seat above the pedal-shaft. Each construction has some advantages and some disadvantages. In the present construction the engine is more readily removable, which is an advantage, and the center of gravity is higher, which is a disadvantage.

I claim herein the following constructions and combinations:

1. In a motor-bicycle, the front and rear lower bars connected by a strut, the engine resting on the strut and having geared connection to a sleeve on the pedal-shaft, a bevel-gear on this sleeve, and a bevel-gear on a shaft in one of the frame-bars, said shaft being in geared engagement with the driving-hub, all combined substantially as described.

2. The combination with the frame-bars of the engine forming a connecting member thereof, a gasolene-tank connected to the seat-post and in rear thereof, and a supplementary tank forming a mud-guard, and communicating with the first tank through a valved opening, substantially as described.

3. The combination with the primary gasolene-tank in rear of the seat-post, of a secondary gasolene-tank over the rear wheel and forming a mud-guard, said tank being supported by the frame, and having a valved communication with the first tank.

4. The engine and cylinder forming part of the seat-post, a muffler arranged in front of the rear wheel and forming part of the mud-guard, and exhaust connection from the engine to said muffler, all combined substantially as described.

5. The combination with the engine having its exhaust at rear of the seat-post, of the section of mud-guard arranged vertically in front of the rear wheel and supported from the frame and from the engine, substantially as described.

In testimony whereof I affix my signature in presence of two witnesses.

ROBERT M. KEATING.

Witnesses:
ALLEN WEBSTER,
DEXTER E. TILLEY.